United States Patent Office 3,046,151
Patented July 24, 1962

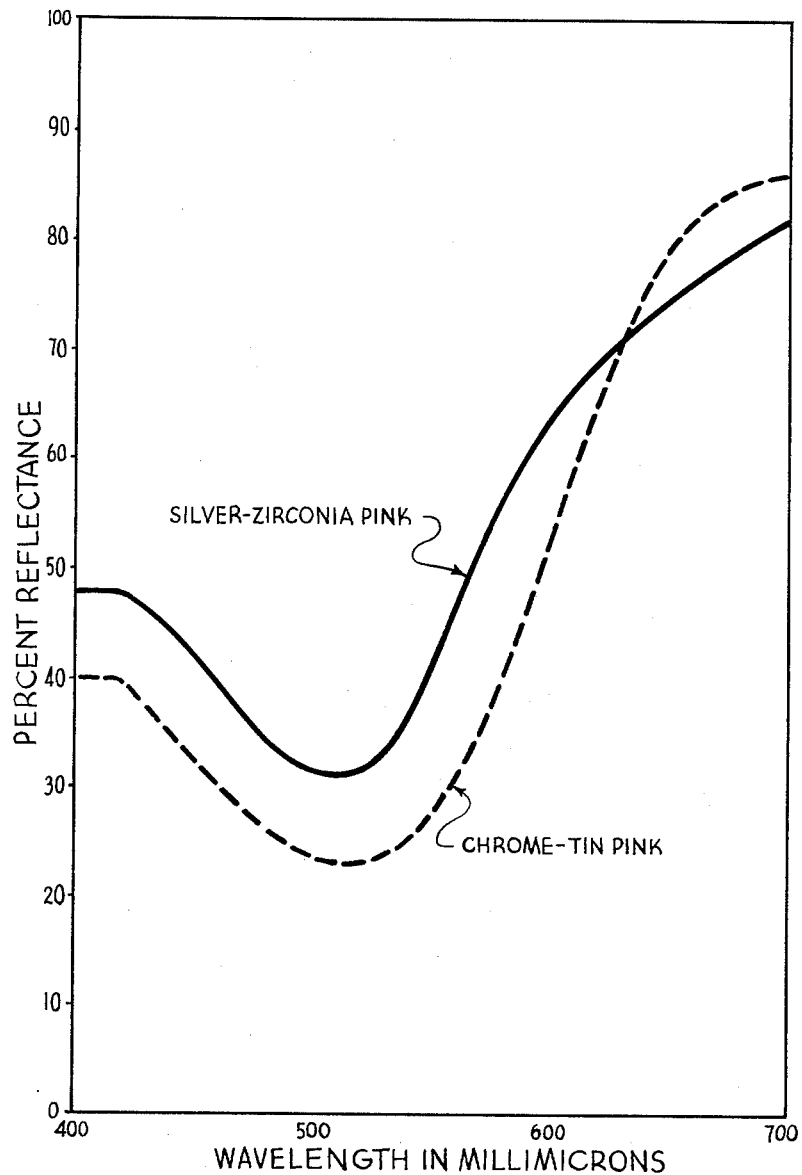

3,046,151
SILVER-ZIRCONIA PINK
Frederic K. Iliff, 314 Washington Ave., Newtown, Pa.
Filed Nov. 25, 1960, Ser. No. 71,572
9 Claims. (Cl. 106—299)

This invention relates to pink ceramic pigments and more specifically to pink ceramic pigments containing silver as a coloring agent.

Silver has long been known to have the ability to serve as a colorant and is often employed directly in glass and in lusters or stains on glass where a yellow or brown coloration is desired. The use of silver as a primary pink ceramic colorant, however, is unknown. The reason for such non-use is probably due to the fact that silver has always been considered as a source of yellow color for which purpose it is currently employed in toning down the strong pink coloration in gold-alumina pink and gold-tin pink. The inability of previous workers to fix a silver colorant in a ceramic color fixing agent is also a reason for the non-use of silver as a primary colorant.

It is, therefore, an object of this invention to prepare a silver-containing ceramic pigment.

It is another object of this invention to provide a method for the fixation of a silver coloring agent in a ceramic color fixing agent.

It is still another object of this invention to prepare a pink ceramic pigment employing silver as the coloring agent.

I have now discovered a method for the preparation of a pink ceramic pigment employing silver as a coloring agent comprising calcining an intimate mixture of silver components capable of yielding metallic silver, zirconium compounds capable of yielding zirconium oxide, fluoride compounds capable of yielding fluoride ions, and preferably a non-volatile organic reducing agent such as, for instance, a reducing agent selected from the group consisting of urea, carbohydrates, cream of tartar and oxalic acid, at a temperature of from about 600° C. to 1100° C., and preferably from about 900° C. to 1000° C. The length of time of calcination has not been found to be critical.

The preferred proportions of silver components present in the calcination mixture are from 0.2% by weight to 10% by weight, reported on the basis of silver present; the silver component being a component such as, for instance, silver powder, silver nitrate, silver carbonate, silver oxide, silver cyanide and silver resinate. The preferred quantities of fluoride compound are present in the calcination mixture in amounts of from 7.0% by weight to 50% by weight; the preferred fluoride compound being a fluoride compound such as, for instance, ammonium bifluoride, zirconium fluoride and zirconium oxyfluoride. The compounds capable of yielding zirconium oxide are preferably present in the calcination mixture in quantities of from 20% by weight to 90% by weight; the zirconium compounds being zirconium compounds such as, for instance, zirconium hydrate, zirconium oxide, zirconium fluoride and zirconium oxyfluoride. The reducing compound is preferably present in the calcination mixture in quantities from 0.5% by weight to 25% by weight, although satisfactory pigments may be produced in the absence of a reducing agent. It appears that those silver compounds contemplated for use in this invention will be reduced to some extent to free silver merely upon being subjected to calcination temperatures of from 600° C. to 1100° C. The pigments produced in the absence of a reducing agent, however, are not as strong as those pigments produced in the presence of a reducing agent. It is assumed that increased quantities of silver metal are present for fixation in the color fixing agent and, therefore, stronger pigments may be obtained through the use of a reducing agent.

It appears that the silver coloring agent is fixed within the zirconium oxide color fixing agent by the ability of the fluoride ion, under calcination conditions, to open the zirconium oxide crystal lattice. The opening of the zirconium oxide crystal lattice occurs simultaneously with the reduction of the silver compound to free silver by means of the high calcination temperatures and preferably by means of the high calcination temperatures acting in conjunction with the aforementioned reducing agents. A large excess of reducing agent may be present since excess quantities of reducing agent do no harm but merely burn out during calcination.

The finished pigment prepared according to the methods outlined herein was found to contain from 0.1% by weight to 9% by weight of silver reported on the basis of silver metal, the balance being essentially all zirconium oxide. All other constituents of the calcination mixture, with the exception of trace amounts were found to fire out. The coloration of the finished pigment appears to be the result of the fixation of colloidal silver within the zirconium oxide crystal lattice.

The color of the ceramic pigments of this invention ranges from a violet to an orchid pink. A better understanding of the color may be obtained from a discussion of the drawing.

The drawing is a graphic representation of the color of two pink tiles, plotting percentage reflectance against wavelength in millimicrons. The plots were obtained from a Hardy Spectrophotometer, using samples containing 8% pigment in a typical cone 02 tile glaze placed on a ceramic tile body. The solid line designates the novel silver-zirconia pink pigment of this invention. The broken line designates a chrome-tin pink.

The chrome-tin pink may be considered a typical pink ceramic pigment. It should be noted that the chrome-tin pink curve exhibits a major degree of reflectance in the red wavelength and a minor degree of reflectance in the blue wavelength. While the silver-zirconia pink curve is roughly similar to the chrome-tin pink curve, the silver-zirconia pink curve is higher in the blue wavelengths and lower in the red wavelengths. The difference in the two curves is due to the silver-zirconia pink being a bluer pink than the chrome-tin pink.

The following examples are given for purposes of illustration and are not to be considered to limit the spirit or scope of this invention:

EXAMPLE I 4 parts of silver nitrate were dissolved in 8 parts of water. A damp mix was then prepared from the silver nitrate solution, 70 parts of zirconium oxide, 60 parts of zirconium fluoride monohydrate and 4 parts of starch. The mix was calcined at 900° C. for a period of two hours. The calcined mixture was then pulverized through a hammer mill and the resulting product was found to have a dark violet gray shade. When this product was employed in 10% strength in a typical cone 02 title glaze and fired on a ceramic tile, the resultant product was found to have a dark bluish-pink color.

EXAMPLE II 4 parts of silver nitrate were dissolved in 8 parts of water. A damp mix was then made with the silver nitrate solution and 70 parts of zirconium oxide and 60 parts of zirconium fluoride monohydrate. The mix was calcined at 900° C. for a period of two hours. The calcined mixture was then pulverized through a hammer mill and the resulting product had a violet gray shade. When this product was employed in 10% strength in a cone 02 tile glaze and fired on a ceramic tile, the resultant product was found to have a light bluish-pink color.

EXAMPLE III 10.6 parts of 6% silver resinate was mixed with 100 parts of zirconium oxide, 80 parts of $NH_4HF_2$ and 8 parts of starch. A sufficient quantity of diethylether was then added to form a damp mix. The mixture was then calcined at a temperature of 1000° C. for a period of about two hours. The calcined mixture was then pulverized by means of a hammer mill and passed through a 40 mesh screen. The resultant product was a light violet gray. When the product was employed in a cone 02 tile glaze in a 10% strength and fired on a ceramic tile, the resultant product was found to have a light orchid pink coloration.

EXAMPLE IV 2 parts of silver powder was mixed with 80 parts of $NH_4HF_2$, 100 parts of zirconium oxide and 2 parts of oxalic acid. The dry mix was then dampened with 8 cc. of water and calcined for five hours at 1000° C. The calcined product was then hammer milled and screened through a 40 mesh screen. The resultant product was a light orchid pink. When this product was employed in 10% strength in a typical cone 02 glaze and fired on a ceramic tile, the resultant product was found to have a bluish-pink coloration.

The following table is further illustrative of the preferred compositions of this invention:

*Examples of Formulas Which Produce Stains*

|  | A | B | C | D | E | F | G | H | I |
|---|---|---|---|---|---|---|---|---|---|
| $AgNO_3$ | 4 | 4 | 4 | 4 | 4 |  |  | 4 | 12 |
| $NH_4HF_2$ | 80 | 80 | 80 | 40 | 120 | 80 | 80 |  | 80 |
| $ZrO_2$ | 100 | 100 | 100 | 100 | 100 | 100 | 100 | 70 | 100 |
| Starch |  | 2 | 20 |  |  | 2 | 2 | 4 | 2 |
| Urea |  |  |  | 2 |  |  |  |  |  |
| Polyvinyl alcohol |  |  |  |  | 2 |  |  |  |  |
| Silver powder |  |  |  |  |  | 2 |  |  |  |
| $AgCO_3$ |  |  |  |  |  |  | 2 |  |  |
| $ZrF_4.H_2O$ |  |  |  |  |  |  |  | 60 |  |
| Calcination Temperature, ° C | 900 | 700 | 1,000 | 1,000 | 1,000 | 1,100 | 1,000 | 900 | 1,000 |
| Color | Light Violet | Orchid Pink | Orchid Pink | Gray Pink | Orchid Pink | Orchid Pink | Orchid Pink | Violet Gray | Orchid Pink |

The ceramic pigment produced by the method of this invention is suitable for use in glazes and in underglaze colors. The color range which may be obtained from the use of this pigment is pale pink to deep orchid. A wider range of colors may also be obtained by blending the ceramic pigments of this invention with other zirconium colors such as blues and yellows.

What I claim is:

1. A method of preparing pink ceramic pigments comprising calcining an intimate mixture of from about 0.2% by weight to about 10% by weight, reported on the basis of silver present, of silver components capable of yielding metallic silver selected from the group consisting of silver powder, silver nitrate, silver carbonate, silver cyanide, and silver resinate; from about 20% by weight to 90% by weight of zirconium compounds capable of yielding zirconium oxide selected from the group consisting of zirconium hydrate, zirconium carbonate, zirconium oxide, zirconium fluoride, and zirconium oxyfluoride; there being present in the mixture a total of from about 7.0% by weight to about 50% by weight of fluoride compounds capable of yielding fluoride ions selected from the group consisting of ammonium bifluoride, zirconium fluoride and zirconium oxyfluoride, at a temperature of from about 600° C. to 1100° C.

2. The method of claim 1 wherein calcination is carried out at a temperature of from about 900° C. to 1000° C.

3. A method of preparing pink ceramic pigments comprising calcining an intimate mixture of from about 0.2% by weight to about 10% by weight, reported on the basis of silver present, of silver components capable of yielding metallic silver selected from the group consisting of silver powder, silver nitrate, silver carbonate, silver cyanide, and silver resinate; from about 20% by weight to 90% by weight of zirconium compounds capable of yielding zirconium oxide selected from the group consisting of zirconium hydrate, zirconium carbonate, zirconium oxide, zirconium fluoride, and zirconium oxyfluoride; there being present in the mixture a total of from about 7.0% by weight to about 50% by weight of fluoride compounds capable of yielding fluoride ions selected from the group consisting of ammonium bifluoride, zirconium fluoride, and zirconium oxyfluoride, and from about 0.5% by weight to about 25% by weight of a non-volatile organic reducing agent, at a temperature of from 600° C. to 1100° C.

4. The method of claim 3 wherein said reducing agent is a reducing agent selected from the group consisting of urea, carbohydrates, cream of tartar and oxalic acid.

5. The method of claim 3 wherein calcination is carried out at a temperature of from about 900° C. to 1000° C.

6. A calcination batch mixture suitable for the preparation of a pink ceramic pigment, said calcination batch mixture consisting essentially of from 0.2% by weight to about 10% by weight, represented on the basis of silver present, of silver components capable of yielding metallic silver selected from the group consisting of silver powder, silver nitrate, silver carbonate, silver cyanide and silver resinate; from about 20% by weight to 90% by weight of zirconium compounds capable of yielding zirconium oxide selected from the group consisting of zirconium hydrate, zirconium carbonate, zirconium oxide, zirconium fluoride, and zirconium oxyfluoride; there being present in the mixture a total of from about 7.0% by weight to about 50% by weight of fluoride compounds capable of yielding fluoride ions selected from the group consisting of ammonium bifluoride, zirconium fluoride, and zirconium oxyfluoride.

7. A calcination batch mixture suitable for the preparation of pink ceramic pigments, said calcination batch mixture consisting essentially of from 0.2% by weight to about 10% by weight, represented on the basis of silver present, of silver components capable of yielding metallic silver selected from the group consisting of silver powder, silver nitrate, silver carbonate, silver cyanide and silver resinate; from about 20% by weight to 90% by weight of zirconium compounds capable of yielding zirconium oxide selected from the group consisting of zirconium hydrate, zirconium carbonate, zirconium oxide, zirconium fluoride, and zirconium oxyfluoride; there being present in said mixture a total of from about 7.0% by weight to about 50% by weight of fluoride compounds capable of yielding fluoride ions selected from the group consisting of ammonium bifluoride, zirconium fluoride, and zirconium oxyfluoride; and from about 0.5% by weight to about 25% by weight of a non-volatile organic reducing agent.

8. The calcination batch mixture of claim 7 wherein said reducing agent is a reducing agent selected from the group consisting of urea, carbohydrates, cream of tartar and oxalic acid.

9. A pink ceramic pigment consisting essentially of from about 0.1% by weight to about 9% by weight of the finished pigment of metallic silver fixed in a zirconium oxide crystal lattice.

References Cited in the file of this patent

UNITED STATES PATENTS

| | | |
|---|---|---|
| 2,068,294 | Korinth | Jan. 19, 1937 |
| 2,623,833 | King et al. | Dec. 30, 1952 |
| 2,875,085 | Morris et al. | Feb. 24, 1959 |